United States Patent
Schmadel (10) Patent No.: US 6,836,323 B2
(45) Date of Patent: Dec. 28, 2004

(54) SPATIAL REFERENCE SYSTEM

(75) Inventor: Ingobert Schmadel, Ann Arbor, MI (US)

(73) Assignee: Metronom U.S., Inc., Ann Arbor, MI (US)

(*) Notice: Subject to any disclaimer, the term of this patent is extended or adjusted under 35 U.S.C. 154(b) by 0 days.

(21) Appl. No.: 10/675,788

(22) Filed: Sep. 30, 2003

(65) Prior Publication Data

US 2004/0066508 A1 Apr. 8, 2004

Related U.S. Application Data

(60) Provisional application No. 60/416,741, filed on Oct. 7, 2002.

(51) Int. Cl.[7] .................................................. G01J 1/10
(52) U.S. Cl. ............................. 356/243.1; 356/243.3; 33/558.2; 33/502; 73/1.79; 73/865.9
(58) Field of Search ......................... 356/243.1–243.8, 356/601; 33/558.2, 502–503, 613–617, 452; 73/1.79, 1 J, 865.9, 1 R; 409/235

(56) References Cited

U.S. PATENT DOCUMENTS

| | | | | |
|---|---|---|---|---|
| 4,435,905 A | * | 3/1984 | Bryan | 33/613 |
| 4,932,136 A | | 6/1990 | Schmitz et al. | 33/502 |
| 5,014,444 A | * | 5/1991 | Breyer | 33/702 |
| 5,052,115 A | * | 10/1991 | Burdekin | 33/502 |
| 5,164,722 A | * | 11/1992 | Laroze et al. | 341/20 |
| 5,259,710 A | * | 11/1993 | Charles | 409/235 |
| 5,269,067 A | | 12/1993 | Waeldele et al. | 33/502 |
| 5,430,948 A | * | 7/1995 | Vander Wal, III | 33/502 |
| 5,681,981 A | * | 10/1997 | McMurtry | 73/1.73 |
| 5,732,474 A | * | 3/1998 | Cannon | 33/452 |
| 5,813,287 A | * | 9/1998 | McMurtry et al. | 74/490.06 |
| 6,269,544 B1 | * | 8/2001 | Pahk et al. | 33/502 |
| 6,293,028 B1 | * | 9/2001 | Sylvia | 33/613 |
| 6,505,495 B1 | | 1/2003 | Blondeau | 73/1.79 |
| 6,662,461 B2 | * | 12/2003 | McMurtry | 33/558.2 |

FOREIGN PATENT DOCUMENTS

| | | |
|---|---|---|
| DE | 199 15 012 A1 | 5/2000 |
| EP | 0258471 A1 * | 3/1988 |

* cited by examiner

Primary Examiner—Hoa Q. Pham
Assistant Examiner—Sang H. Nguyen
(74) Attorney, Agent, or Firm—Bliss McGlynn, P.C.

(57) ABSTRACT

The present invention overcomes the disadvantages of the related art by providing a spatial reference system that includes at least one artifact assembly. The artifact assembly has a measuring bar assembly including an inner member with a proximate end and a distal end, an outer member with a proximate end and a distal end, and a compensating member with a proximate end and a distal end operatively disposed between said inner and said outer members. The distal end of the outer member is fixedly mounted to the distal end of the compensating member. The proximate end of the compensating member is fixedly mounted to the proximate end of the inner member. The inner and the outer members each have a predetermined length and a predetermined coefficient of thermal expansion and the compensating member has a predetermined length and a predetermined coefficient of thermal expansion, such that the thermal expansion of the inner and the outer members is substantially eliminated by the expansion of the compensating member.

14 Claims, 7 Drawing Sheets

SPATIAL REFERENCE SYSTEM

This application claims the benefit of provisional application U.S. Ser. No. 60/416,741 entitled SPATIAL REFERENCE SYSTEM filed Oct. 07, 2002.

BACKGROUND OF THE INVENTION

1. Field of the Invention

The invention relates, generally, to a precision measuring system and, more specifically, to a spatial reference system for making dynamic and rapid measurements in one, two, or three dimensions simultaneously.

2. Description of the Related Art

Measurement techniques and strategies used to determine physical dimensions or other spatial quantities are well known. Some of the most common tools or devices that people associate with taking measurements include rulers, measuring tapes, marked vessels, scales, clocks, and stopwatches. These devices are relied upon to be accurate to a relative measurement standard. When greater measuring precision is required more accurate measuring devices must be employed, such as micrometers, vernier calipers, and electronic scales and balances, for example. These measuring devices fundamentally have greater precision, or a higher degree of accuracy, by their calibration to a finer or smaller degree of deviation from a known and stable standard. However, the accuracy of any precision measuring device also relates to its ability to maintain a stable and unchanging adherence to its initial calibration.

In the production and manufacturing industries, precision measurement is extremely important. Quantitative measurements relating to length, volume, and weight, also known as dimensional metrology, are fundamental to the manufacture of physical objects and devices as well as the control of a wide variety of processes. Production machines (i.e., milling machines, boring machines, high-speed assembly devices, etc), measurement related instruments used in production (i.e., alignment tools, micrometers, calipers, etc.), and movable production devices (i.e., robotic handling devices and welders, laser and water cutting devices, automated assemblers, etc.) all require precision calibration to provide the desired level of accuracy necessary to carry out their design function. For example, if it is desired to operate a repetitive precision milling process to produce a quantity of identical parts with a high degree of accuracy, the alignment of the various parts of the milling machine as well as the alignment of the cutting elements is critical to the process and must be maintained during the operation.

In a like manner, if it is desired to produce a physical object, or to repetitively reproduce an object from plans or an original, the object produced must meet the predetermined dimensions within an acceptable tolerance of precision from the original. This means that the produced objects themselves must be measured, either individually or by representative samplings to ensure that the accuracy of production is maintained throughout the process. The necessity for accuracy and precision in manufacturing processes highlights a number of drawbacks and disadvantages of conventionally available measuring devices.

In practice, the physical dimensions of a produced object or the alignment and calibration of a production machine may be measured through a variety of methods including the use of instruments, optical devices, and artifacts. When an artifact, also referred to as a test body, or specimen is used, a number of different approaches for precision measuring may be employed. Particularly, an artifact may be used as an exact, highly precise model, or copy, of a desired object in which the dimensions of the artifact are accurately followed to produce replicas. An artifact may also be the physical standard of a known, precise dimension to which other measuring devices are calibrated against, or the artifact may be used itself as the known dimensional standard to which other devices are aligned by, or calibrated against. Most often this latter type of artifact takes the form of a length bar or gauge block.

Length bars and long gauge blocks are among the most commonly used measuring standards for maintaining a repeatable precision in dimensional metrology. They are used to calibrate a wide range of instruments and other standards from micrometers to co-ordinate measuring machines (CMMs). Before use, all length bars and long gauge blocks must themselves be calibrated according to various specification standards such as governmental standards or engineering society standards. Length bars and long gauge blocks must also be re-checked and calibrated periodically to ensure that they maintain their accuracy. More importantly, they must also be used within a given temperature range or their calibration becomes uncertain due to thermal expansion. All materials, as an inherent physical property, have a unique coefficient of thermal expansion. In a linear manner, the coefficient represents the material's expansion (or contraction) as a change in the length of the object per each unit length of the object for a one degree change in temperature. Thus, when the length bar or gauge block is used in differing temperature environments, the thermal expansion coefficient of the material of the artifact introduces a measurement uncertainty. In some circumstances, the changes due to thermal expansion of a measuring artifact may be constantly calculated and accounted for by the software of a particular production machine's operating or controlling software. However, this requires additional sensors, monitoring devices, and compensation methods that are often not practical or are beyond the capability or capacity of most production devices. Thus, a calibrated length bar or gauge block has remained the typical measuring device.

The inherent drawback to using a calibrated length bar or gauge block is that the required calibration is a time consuming process that must be performed regularly if exacting standards for precision are to be maintained. Additionally, since the calibrated length bar or gauge block is only as good as the control of the temperature of the environment in which it is placed, these types of measuring artifacts must be kept at a controlled temperature. Otherwise, if the temperature of the ambient environment or the temperature of the artifact changes, its physical dimensions will change and the accuracy and precision of the artifact will be compromised. This often places stringent requirements over the control of the environment surrounding the manufacturing process. In certain manufacturing situations, the ambient environment is such that temperature control is difficult or unfeasible. In these circumstances several sets of artifacts are used, each artifact being maintained at a controlled temperature until its time of use. Thus, there is an ongoing need in the art to provide a measuring artifact that maintains its precision to the predetermined standard without deviation related to thermal influences and avoids the need for repetitive recalibration.

An additional consideration with the use of measuring artifacts, in relation to thermal coefficients of expansion, is the fact that any expansion of the artifact is a function of its overall length. In other words, uncertainty in the accuracy of the artifact is more difficult to control in long measurement artifacts as the coefficient of thermal expansion is relative to a unit length of the material in question. Thus, the longer the artifact, the greater its expansion for a particular change in temperature, making it difficult to measure longer alignment or calibrating distances with precision. This further highlights the need for an artifact that is constructed in such a manner that the coefficient of expansion is non-existent or is compensated out, not only over relatively short spans, but also longer measurement distances as well.

Another disadvantage with conventional measuring artifacts is that typical length bars and gauge blocks are good for a measurement standard along one-dimensional plane only (i.e., length, rather than length and width). However, many manufacturing situations require that an artifact provide precision locating or measurement not only along one axis but also along the second and/or third axes. In other words, it is desirable to have a measuring artifact or a combination of artifacts in a reference system that can provide precision locating in two and three-dimensional space (2D and 3D) at one time. Therefore, there exists a need to not only have a measuring artifact that overcomes the above-mentioned inadequacies but one that can be used in multiple combinations to provides a stable, highly precise spatial reference system, which functions in 2D and 3D spatial orientations, as well.

Certain attempts have been made at improving measuring systems along the lines of developing spatial (3D) measuring devices, as evidenced by German patents DE 11860883, DE 19708830, and DE 19915012. However, the body, or main portion, of the measuring artifacts in these designs are either constructed of certain types of carbon fiber based materials that are susceptible to humidity or glass based materials that are delicate and can easily be damaged. Moreover, if an artifact that is constructed of either of these types of material are inadvertently struck or bumped along their length, unseen internal stress cracks and fractures will result that alter, and increase, their thermal expansion properties.

These patents also disclose the use of other, relatively new, alloyed materials that are known to have much lower coefficients of thermal expansion than conventional metals, such as Invar, for example. However, these alloyed materials still exhibit some expansion and thereby leave room for improvement. Additionally, the end probes used in these designs utilize a number of component parts that have distinct thermal expansion coefficients that must be accounted for. While these designs do offer some improvements over length bars and gauge blocks, particularly by offering better spatial (2D and 3D) measuring capabilities, and improved dimensional stability regarding thermal influences, they still ultimately suffer the same shortcomings of uncertainty in measurement accuracy as all conventional measurement standards currently available. Therefore, beyond the simple use of materials at exhibit minimal thermal expansion, there still remains a need for an artifact that has a physical structure that completely compensates for all the expansion of its components such that there is no change in the length of the artifact.

SUMMARY OF THE INVENTION AND ADVANTAGES

The present invention overcomes the disadvantages of the related art by providing a spatial reference system that includes at least one artifact assembly. The artifact assembly has a measuring bar assembly including an inner member with a proximate end and a distal end, an outer member with a proximate end and a distal end, and a compensating member with a proximate end and a distal end operatively disposed between said inner and said outer members. The distal end of the outer member is fixedly mounted to the distal end of the compensating member. The proximate end of the compensating member is fixedly mounted to the proximate end of the inner member. The inner and the outer members each have a predetermined length and a predetermined coefficient of thermal expansion and the compensating member has a predetermined length and a predetermined coefficient of thermal expansion, such that the thermal expansion of the inner and the outer members is substantially eliminated by the expansion of the compensating member.

Thus, the present invention also overcomes the disadvantages of the related art by providing a measuring bar artifact that is thermal expansion compensated and can be combined with like artifacts to provide a spatial reference system for precision orienting, locating, and positioning in one, two, and three dimensions.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
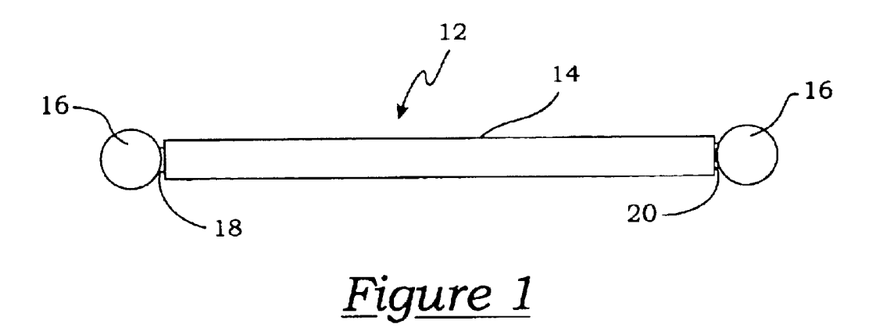
FIG. 1 is a side view of a singular measuring artifact of the a spatial reference system of the present invention.
Figure 2A:
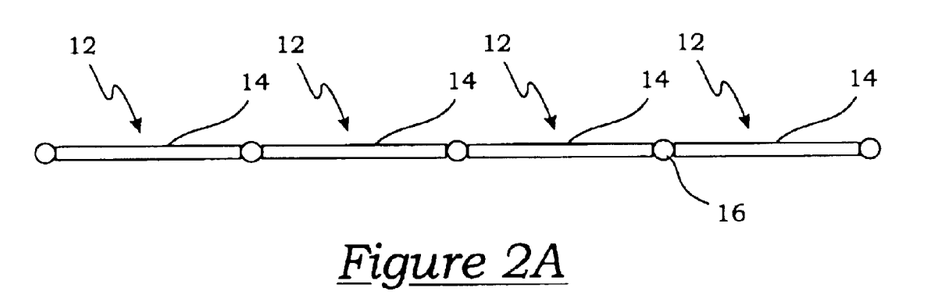
FIG. 2A is a side view of a series of measuring artifacts of the a spatial reference system of the present invention used for linear reference.
Figure 2B:
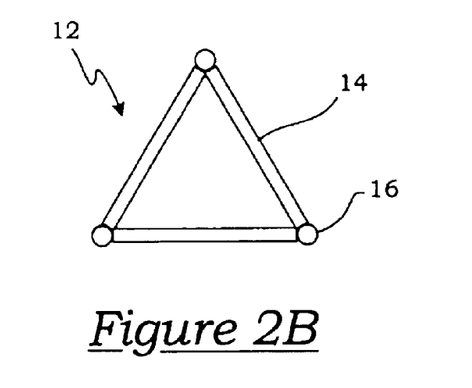
FIG. 2B is a side view of three measuring artifacts of the a spatial reference system of the present invention combined to form a two dimensional triangular reference.
Figure 2C:
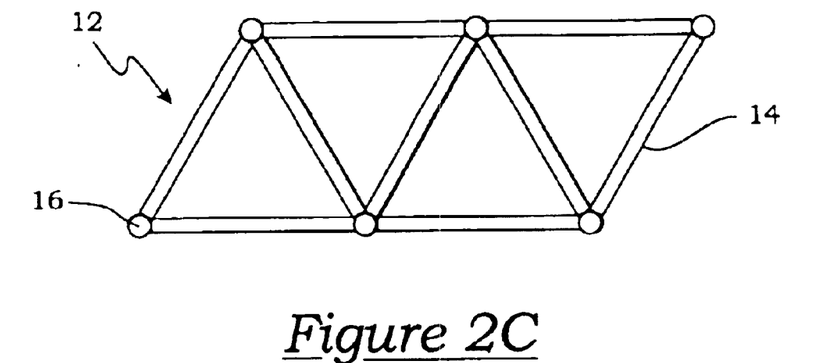
FIG. 2C is a side view of a series of measuring artifacts of the a spatial reference system of the present invention combined in triangular series to form a two dimensional parallelogram reference.
Figure 2D:
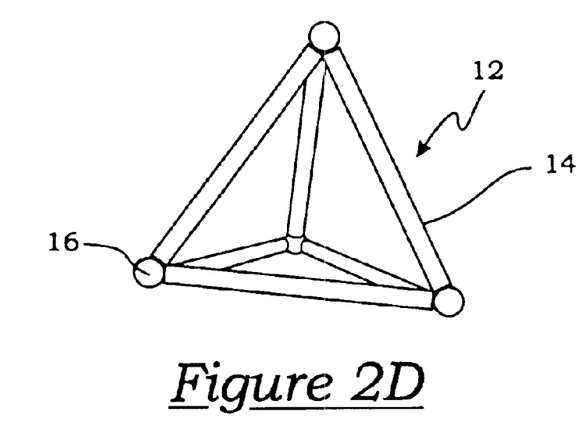
FIG. 2D is a perspective view of a series of measuring artifacts of the a spatial reference system of the present invention combined in triangular series to form a three dimensional tetrahedronal reference.
Figure 2E:
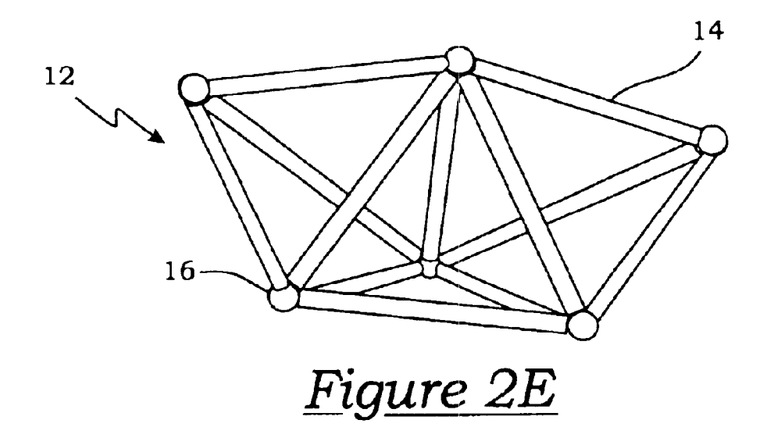
FIG. 2E is a perspective view of a series of measuring artifacts of the a spatial reference system of the present invention combined in tetrahedron series to form a complex three dimensional reference.

The present invention is directed to a spatial reference system that is constructed of a number of identical elements, or artifacts. For example, FIG. 1 shows a single artifact of the present invention, generally indicated at 12, where like numerals are used to describe like structure throughout the figures. The artifact 12 includes a main measuring bar 14, end probes 16, a first end adapter assembly 18, and a second end adapter assembly 20. A series of artifacts 12 may be concomitantly connected together by their end adapter assemblies 18, 20 with adjacent ends of the measuring bars 14 sharing an end probe 16. In this manner, the artifact assemblies 12 may be arranged to form any of a variety of triangularly based geometric shapes. See, for example, FIGS. 2A through 2E which provide an accurate point, and or points, of reference to form a spatial reference system for one, two, and three dimensional spatial locating, reference, or calibration. The tetrahedron, shown in FIG. 2D is the most stable geometric configuration and can provide a precision spatial reference simultaneously in three dimensions.

Figure 3A:
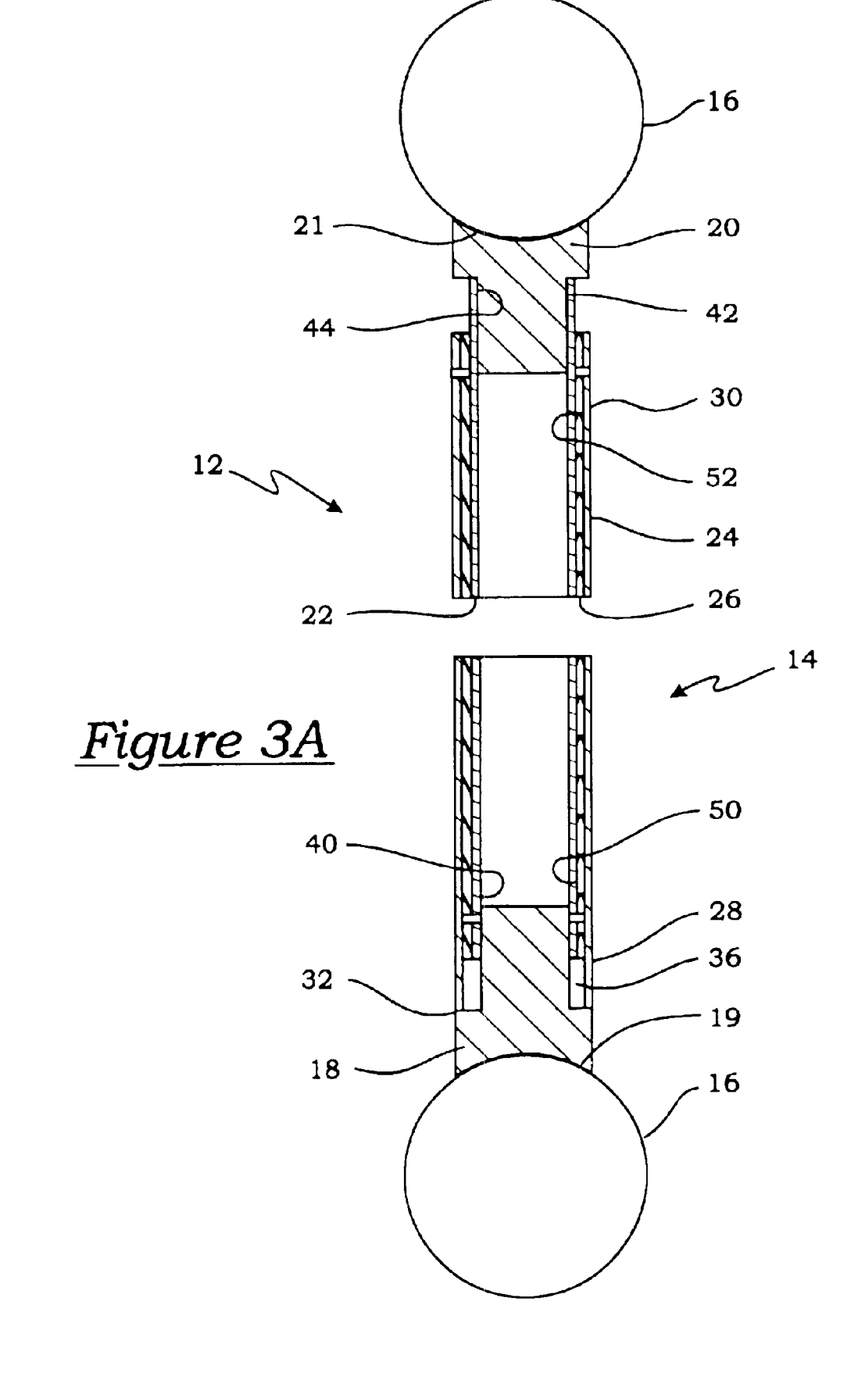
FIG. 3A is a cross-section of a measuring artifact of the present invention.

In the preferred embodiment, the end probes 16 are spheres that are constructed of any of a variety of materials that include ceramic-based materials and metal alloys. The end probes 16 may be of various diameters, generally equal to, or larger than the cross-sectional dimension of the main measuring bar 14. The extensions ends 19 and 21 of the adapter assemblies 18 and 20 have a concave shape to accept the spherical curve of the end probes 16 (FIG. 3A). The end probes 16 may be held in the end adapter assemblies 18 and 20 in any of a variety of manners, such as adhesives or by magnetic attraction. The end probes 16 may also be formed in any of a variety of other geometric shapes with the extension ends 19, 21 of the end adapter assemblies having a like cooperative shape to accept them. The choices of end probe shapes, their material composition, and probe to end adapter assembly interaction are application specific, and beyond their influence to the effects on thermal expansion of the artifact are not germane to the discussion.

Figure 3B:
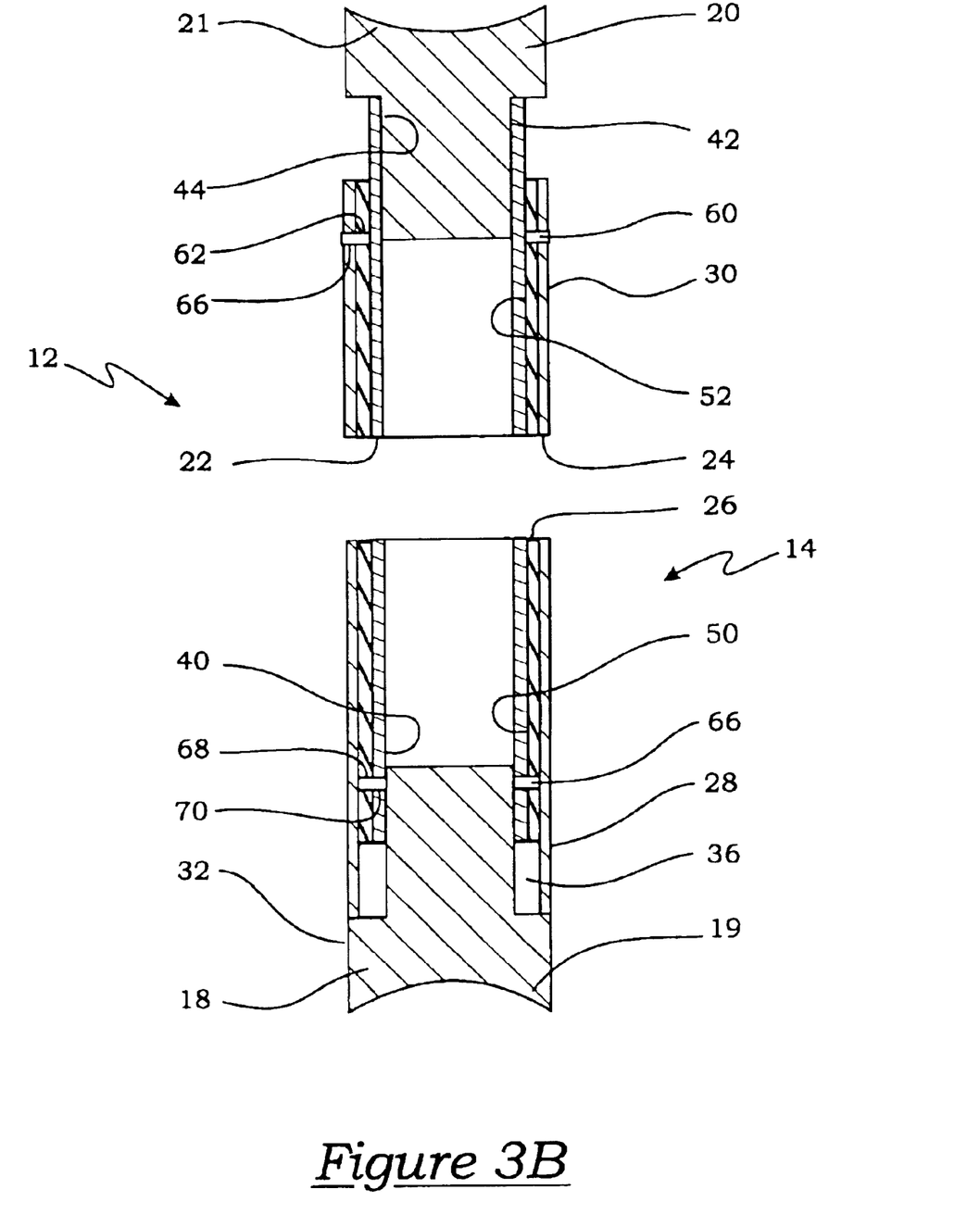
FIG. 3B is a detailed view of the end portions of the cross-section of a measuring artifact of the present invention as shown in FIG. 3A.
Figure 3C:
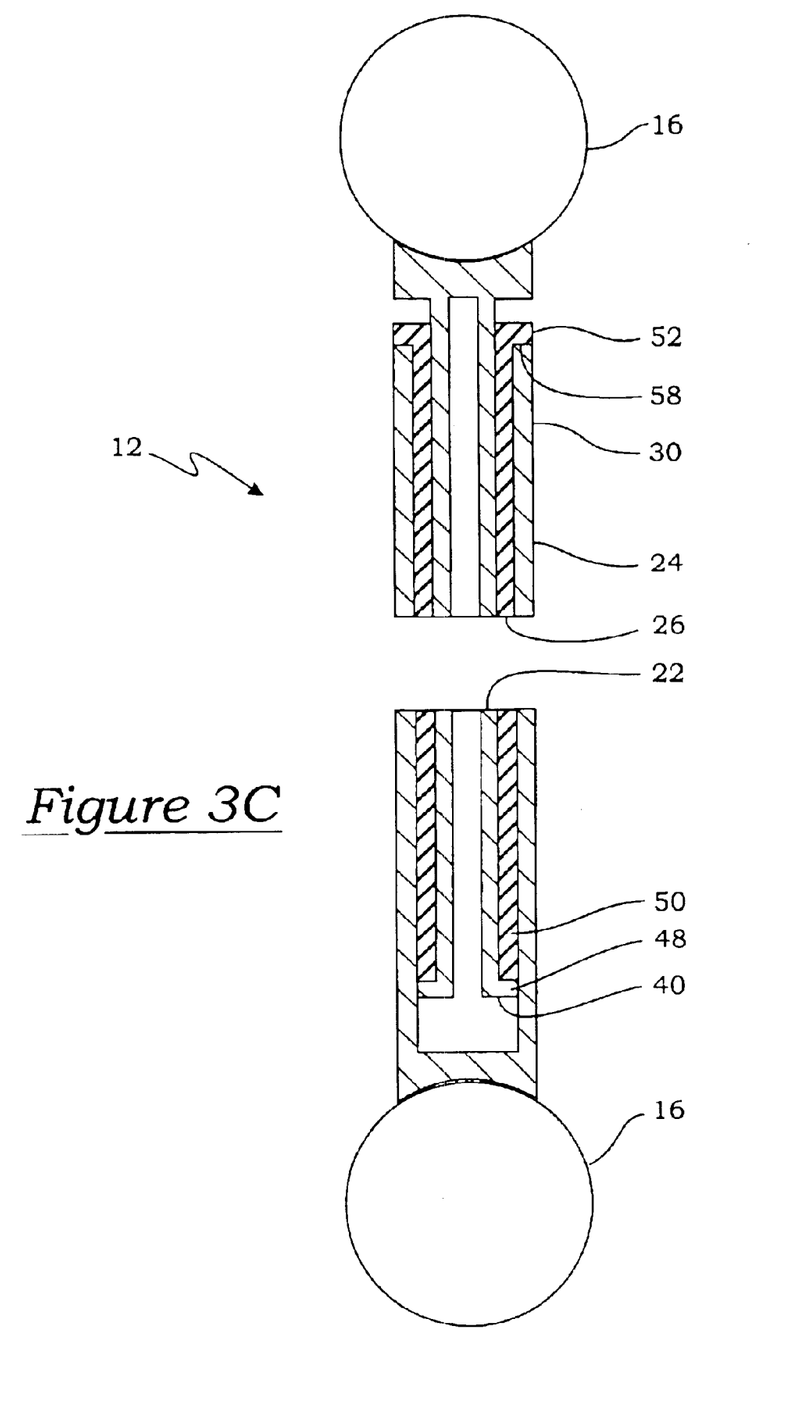
FIG. 3C is a cross-sectional view of another embodiment of a measuring artifact of the present invention.

As shown in FIGS. 3A, 3B, and 3C, the artifact assembly 12 includes a main measuring bar assembly 14 having an inner member 22, an outer member 24, and a compensating member 26 operatively disposed between the inner and outer members. In the preferred embodiment, the inner 22 and outer 24 members are constructed of the same material having a particular predetermined coefficient of thermal expansion. The compensating member 26 is constructed of a material having a different predetermined coefficient of thermal expansion, such that any expansion of the inner and outer members 22 and 24 is cancelled out (i.e., compensated for) by the expansion of the compensating member 26. In the preferred embodiment as shown in FIGS. 3A, 3B and 3C, the thermal expansion of the end probes 16 and end adapter assemblies 18, 20 are also taken into consideration. The effects of the end probes 16 and end adapter assemblies 18, 20 will be discussed later, but for purposes of explanation, the following discussion will concern itself with the expansion of the central components of the main measuring bar 14 first.

To accomplish a compensated expansion of the main measuring bar assembly 14, the inner 22, outer 24, and the compensating member 26 are cooperatively structured as follows. The outer member 24 includes an adjacent, or proximate end 28 and a distal end 30. In the preferred embodiment, the end adapter assemblies 18, 20 are substantially similar but are attached to their respective members differently. The adjacent end 28 of the outer member 24 is fixed to the end adapter assembly 18 at the ledge surface 32 of the end adapter. It should be appreciated that the end adapter 18 is affixed to the outer member 24 by any of a variety of known methods such as a compatible adhesive material for example. Mounting the end adapter 18 to the outer member 24 forms a hollow tube that includes a cavity 36, which is of sufficiently open width to slidingly accept the inner member 22 and the compensating member 26 as they are operatively housed within the outer member 24 as discussed below.

The inner member 22 includes an adjacent, or proximate end 40 and a distal end 42. The end adapter assembly 20 has a narrowed diameter portion 44, which is disposed and fixedly mounted within the distal end 42 of the inner member 22. It should be appreciated that the end adapter assembly 20 is affixed to the inner member 22 by any of a variety of known methods such as a compatible adhesive material for example.

The compensating member 26 also includes an adjacent, or proximate end 50 and a distal end 52. The compensating member 26 is slidingly disposed between the inner and the outer members 22 and 24. The distal end 52 of the compensating member 26 is fixed to the distal end 30 of the outer member 24. The proximate end 50 of the compensating member 26 is fixed to the distal end 42 of the inner member 22. In the preferred embodiment, as shown in FIG. 3A, and in greater detail in FIG. 3B, the compensating member 26 is fixed to the outer member 24 by a plurality of pins 60 which are disposed in a plurality of bores 62 in the compensating member 26 and a corresponding plurality of bores 64 in the outer member 24. The compensating member 26 is fixed to the inner member 22 by a plurality of pins 66 which are disposed in a plurality of bores 68 in the compensating member 26 and a corresponding plurality of bores 70 in the inner member 22.

In an alternate embodiment, shown in FIG. 3C, the distal end 52 of the compensating member 26 is outwardly flanged to form an attachment ledge 58. The attachment ledge 58 fits over and retains the distal end 30 of the outer member 24. The proximate end 40 of the inner member 22 is also outwardly flanged to form an attachment ledge 48. The attachment ledge 48 of the inner member 22 fits over and engages the proximate end 50 of the compensating member 26. The attachment ledges 48 and 58 are affixed to the ends of the other members in any of a variety of known manners, such as welding or adhesives for example, that will physically connect them yet avoid any introduction of material that would influence their thermal expansion properties.

It should be appreciated by those having ordinary skill in the art that the attachment ledges 48 and 58 of the members in FIG. 3C are not limited in their placement on specific ends of the members as mentioned above and may be oriented on the other ends of the members as well. It should be further appreciated that the shapes of the inner 22, outer 24 and compensating member 26 may be cylindrical, square, or have any other axial cross-sectional shape, which will allow the members to fit slidingly within each other. It should be still further appreciated that, as illustrated, the members fit close enough to allow them to provide longitudinal support for each other, yet loose enough for them to move slidingly against each other to allow for their individual linear expansion.

The structure of the main measuring bar 14 provides compensated thermal expansion, or more precisely, compensates for its own thermal expansion such that its overall length does not change. To analyze the compensated thermal expansion in steps, we will refer to FIGS. 3A and 3B and consider that the first end probe 16 and first end adapter assembly 18 of the main bar assembly 14 are set at a fixed point of reference. In the preferred embodiment for ease of construction, the inner and outer members 22 and 24 of the main measuring bar assembly 14 are of the same effective length. More specifically, the distance from the point at which the proximate end 28 of the outer member 24 is fixedly mounted to the first end adapter 18 to the point at which the distal end 30 of the outer member 24 is fixedly mounted to the distal end 52 of the compensating member 26 is the same as the distance from the point at which the proximate end 50 of the compensating member 26 is fixedly mounted to the proximate end 40 of the inner member 22 to the point at which the distal end 42 of the inner member 22 is fixedly mounted to the second end adapter 20.

First, considering only the expansion of the outer member 24 in response to a given increase in temperature, the outer member 24 will expand linearly upward, as illustrated in FIGS. 3A and 3B, a given distance "$\Delta L$". This is mathematically expressed by a known formula for change in linear length due to a change in temperature:

$$L_o * \alpha * \Delta t = \Delta L \qquad (1)$$

Where $L_o$ is the original length (i.e. effective length) of the object; $\alpha$ is the coefficient of thermal expansion of the material of the object; $\Delta t$ is the change in temperature; and $\Delta L$ is the change in length. Due to their interconnection, the distal end 30 of the outer member 24 moves the distal end 52 of the compensating member 26 upward the same amount. Further, the connection of the proximate end 50 of the compensating member 26 to the proximate end 40 of the inner member 22 also causes the second end adapter 20 and the second end probe 16 to move a like distance "$\Delta L$" upward away from its original position. The term "upward" used herein is a relative term in regard to a positive coefficient of thermal expansion. However, it should be appreciated by those having ordinary skill in the art that the use of materials having negative coefficients of thermal expansion may also be employed such that the distance "$\Delta L$" would be "downward" in the illustrations.

Second, in response to the same given increase in temperature, the inner member 22 will also expand linearly a given distance "$\Delta L$." Since the inner member 22 has the same effective length as the outer member 24 and it is constructed of the same material as the outer member 24, the inner member's "$\Delta L$" expansion will be the same as the "$\Delta L$" expansion of the outer member 24. Further, since the inner member 22 is connected to the outer member 24 through the compensating member 26, the expansion of the inner member 22 will also be upward, as viewed in the illustrations. Thus, considering only the expansion of the inner 22 and outer 24 members, the second end probe 16 and the second end adapter assembly 20 would be located at ($\Delta L+\Delta L$), or $2\Delta L$ upward from their original position, for the given change in temperature.

Third, the expansion of the compensating member 26, in response to the same given increase in temperature must also be considered. In particular, since the compensating member 26 also expands and is interconnected between the inner 22 and outer 24 members, as described above, its expansion effectively moves the connection point between its proximate end 50 and the proximate end of the inner member 22 downward, as shown in the illustrations, in the opposite direction from the combined expansion of the inner 22 and outer 24 members.

Thus, simply stated, since the compensating member 26 is approximately the same effective length as the inner and outer member 22, 24, it is merely necessary to chose a material for the compensating member 26 that has a coefficient of thermal expansion which is approximately twice as great as the coefficient of thermal expansion in the material chosen for the inner 22 and outer 24 members, so that the $2\Delta L$ of the inner 22 and outer 24 members is cancelled out by an equivalent expansion of the compensating member 26 in the opposite direction.

More precisely, by applying the linear expansion formula above and using the exact length of the compensating member 26, the precise coefficient of expansion can be determined to cause the change in length of the compensating member 26 to be equal to the combined $2\Delta L$ of the inner 22 and outer 24 members. In this way, the expansion of the compensating member 26 exactly cancels out and compensates for the expansion of the inner 22 and outer 24 members. It should be appreciated, however, that the present invention is not limited to having equal length inner 22 and outer 24 members. In fact, the selection of the effective lengths of the members and the selection of the particular materials used can vary greatly. Varying the comparative lengths of the members varies the choice of the materials based on their coefficients of expansion. Likewise, choosing different materials for the members of the measuring bar 14 will also allow the measuring bar to be formed in a many different overall lengths.

These various choices can be mathematically illustrated by adapting the above-mentioned formula for change in linear length due to a change in temperature of a single object to solve for more than one object. Since the desired outcome is that the change in length of the compensating member 26 equals the change in length of the inner member 22 combined with the change of length of the outer member 24, then the following formula can be written for this expression:

$$\Delta L_3 = \Delta L_1 + \Delta L_2 \qquad (2)$$

Where, $\Delta L_3$ is the change in length of the compensating member 26; $\Delta L_1$ is the change of length of the inner member 22; and $\Delta L_2$ is the change of length of the outer member 24. If it is desired to use the same material for the inner and outer members 22 and 24, then expression "2" can be combined with expression "1" above and simplified to yield the following expression that represents the original member lengths in terms of the coefficients of thermal expansion:

$$\frac{\alpha \times (L_{o1} + L_{o2})}{L_{o3}} = \alpha_3 \qquad (3)$$

This expression is valid where both the inner 22 and outer 24 members are of the same material and thereby have the same coefficient of thermal expansion, which allows a common term $\alpha$ to represent that common value. As used equation (3) above, $L_{o1}$ is the original length of the inner member 22, $L_{o2}$ is the original length of the outer member 24, $\alpha_3$ is the coefficient of thermal expansion of the compensating member 26, and $L_{o3}$ is the original length of the compensating member 26. If the inner 22 and outer 24 members are the same length, then ($L_{o1}+L_{o2}$) can be replaced by (2L).

It should be appreciated that this formula can be algebraically manipulated to provide a solution when either the desired lengths are known or when a particular material is desired. Furthermore, it should be also appreciated that physical limitations may be imposed on the selection of materials or on the lengths of the members of the measuring bar 14 by the availability of usable materials having the particular coefficient of expansion necessary to solve this equation.

Additionally, in another alternate embodiment, when it is desirable to have differing materials for the inner 22 and outer 24 members, the expression can be changed such that the terms representing the coefficients of thermal expansion are set out separately, as follows:

$$\frac{\alpha_1 L_{o1} + \alpha_2 L_{o2}}{L_{o3}} = \alpha_3 \quad (4)$$

Where $\alpha_1$ represents the coefficient of thermal expansion for the inner member 22 and $\alpha_2$ represents the coefficient of thermal expansion for the outer member 24. In this manner, either expression may be manipulated and values for the terms inserted to arrive at either the necessary lengths of the members when particular coefficients of thermal expansions are desired, or the required coefficients of expansion when particular member lengths are desired.

In the preferred embodiment, the end probes 16 and the end adapter assemblies 18 and 20 are constructed of materials that have a minimal coefficient of thermal expansion. However, it can seen from the analysis of the above mathematical expressions that the expansion of the end probes 16 and the end adapter assemblies can also be compensated for in the selection of the materials of the inner 22, outer 24, and compensating 26 members. Thus, given that the coefficient of thermal expansion and ultimately the linear expansion of the end probes 16 and end adapter assemblies 18 and 20 is known, these terms can become part of the equation for compensated thermal expansion. More specifically, as shown in FIGS. 3A and 3B, only the length of the extending end portions 19 and 21 of the end adapter assemblies 18 and 20 would add to the calculations regarding the length of the inner 22 and outer 24 members. Thus, if the material of the end adapter assemblies 18 and 20 is the same as the material of the inner 22 and outer 24 members, then the $L_{o1}$ and $L_{o2}$ terms would merely include the additional length. Such as:

$$\frac{\alpha \times (L_{o1} + L_{o2} + L_{o4} + L_{o5})}{L_{o3}} = \alpha_3 \quad (5)$$

where terms $L_{o4}$ and $L_{o5}$ are the lengths of the extended portions 19 and 21 of the end adapter assemblies 18 and 20. The inner and outer members 22, 24 and the end adapter assemblies 18,20 all have the same coefficient of thermal expansion with the common term $\alpha$ representing that value.

If the end adapter assemblies 18 and 20 are of a different material composition than the inner 22 and outer 24 members, then the additional terms $L_{o4}$ and $L_{o5}$ must be considered in the calculations with their own coefficient of thermal expansion. In this case, the equation is expressed as:

$$\frac{\alpha_1(L_{o1} + L_{o2}) + \alpha_2(L_{o4} + L_{o5})}{L_{o3}} = \alpha_3 \quad (6)$$

where $\alpha_1$ represents the coefficient of thermal expansion for the inner member 22 and outer member 24 and $\alpha_2$ represents the coefficient of thermal expansion for the end adapter assemblies 18 and 20. In this way, the length of the compensating member $L_{o3}$ or the coefficient of thermal expansion $\alpha_3$ of the compensating member 26 can be mathematically adjusted to further compensate for the addition of the extended end portions 19, 21 of the end adapter assemblies 18 and 20.

It should be appreciated that, as shown in FIGS. 3A and 3B, the extending end portions 19 and 21 of the end adapter assemblies 18 and 20 are very small in relation to the entire length of the main measuring bar 14 and may prove to be negligible depending on the degree of precision desired or on the types of materials chosen. It should be further appreciated that it is possible to place the end adapter assemblies 18 and 20 fully within the end of the inner and outer members 22 and 24 thereby eliminating the necessity to separately include them in the thermal expansion equations.

Likewise, the material for the end probes 16 is also chosen considering the coefficient of thermal expansion and ultimately the additional expansion to the overall device, so that they also become part of the equation for compensated thermal expansion. Thus, if the material of the end probes 16 is the same as the material of the inner 22 and outer 24 members and end adapter assemblies 18 and 20, then the expression would merely include both their additional lengths ($L_{o6}$). It should be appreciated that, since a single artifact is most often employed with like artifacts to provide stable geometric shapes as part of a spatial reference system, the ($L_{o6}$) measurement in referring to the additional length considered by the inclusion of the end probes 16 represents the spherical radius of each end probe 16. In this case, the equation is expressed as:

$$\frac{\alpha \times (L_{o1} + L_{o2} + L_{o4} + L_{o5} + 2L_{o6})}{L_{o3}} = \alpha_3 \quad (7)$$

where term $2L_{o6}$ is the combined lengths ($L_{o6}+L_{o6}$) both of the end probes 16. In this expression, the inner and outer members 22, 24, the end adapter assemblies 18, 20, and the end probes 16 all have the same coefficient of thermal expansion with the common term $\alpha$ representing that value.

However, since it is most likely that the end probes 16 are composed of a different material composition than the inner 22 and outer 24 members, then the additional term $2L_{o6}$ must be calculated in with their own coefficient of thermal expansion. In this case, the equation is expressed as:

$$\frac{\alpha_1(L_{o1} + L_{o2}) + \alpha_2(L_{o4} + L_{o5}) + \alpha_4(2L_{o6})}{L_{o3}} = \alpha_3 \quad (8)$$

where $\alpha_1$ represents the coefficient of thermal expansion for the inner member 22 and outer member 24; $\alpha_2$ represents the coefficient of thermal expansion for the end adapter assemblies 18 and 20; and $\alpha_4$ represents the coefficient of thermal expansion for the end probes 16. In this way, the length of the compensating member $L_{o3}$ or the coefficient of thermal expansion $\alpha_3$ of the compensating member 26 can be mathematically adjusted to further compensate the addition of the end probes 16.

Figures 4A, 4B:
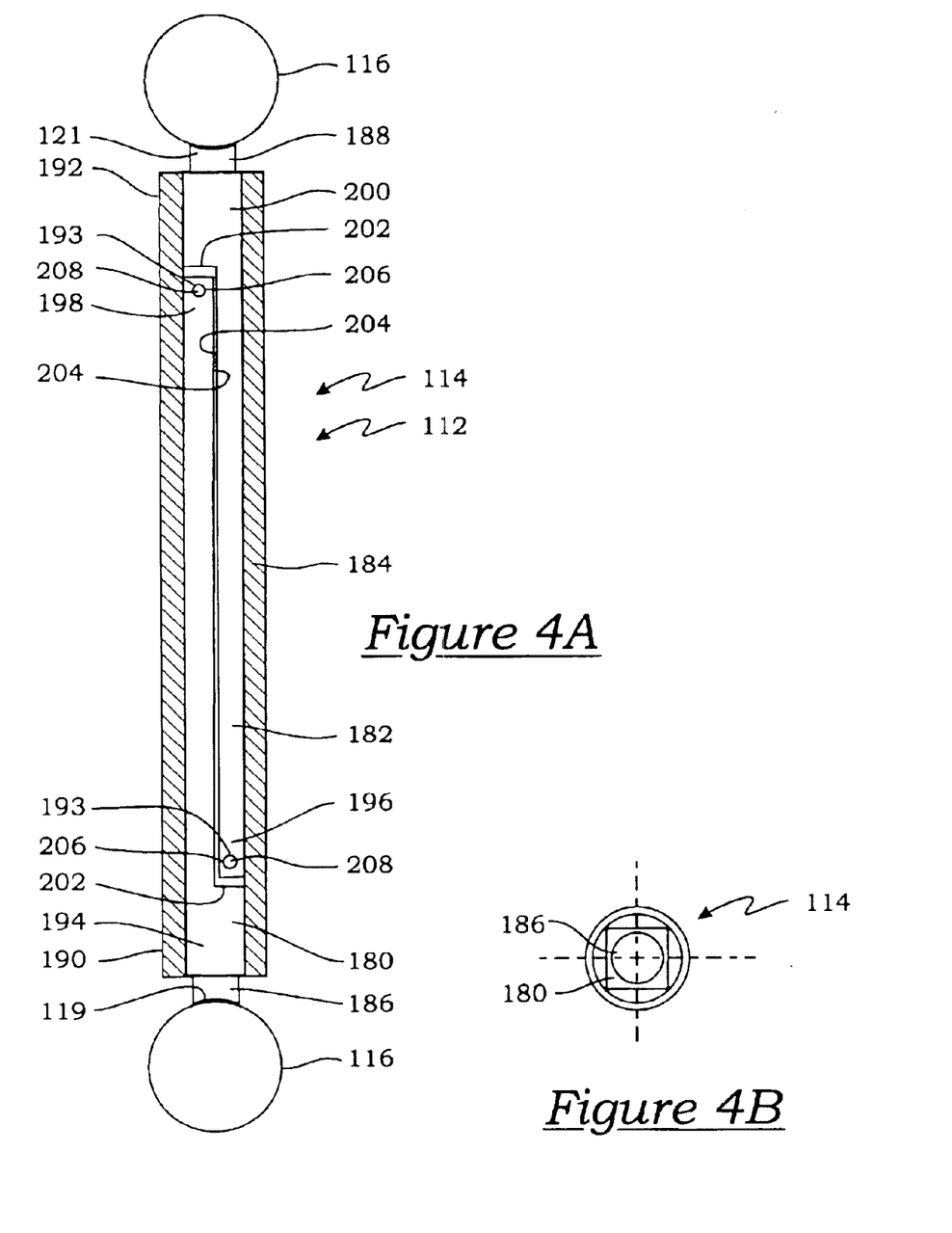
FIG. 4A is a cross-sectional view of another embodiment of a measuring artifact according to the present invention
FIG. 4B is an end view of one embodiment of a measuring artifact according to the present invention.

In another non-limiting embodiment, shown in FIGS. 4A and 4B, the artifact assembly 112 includes a main measuring bar assembly 114 and two end probes 116. The main measuring bar assembly 114 includes two inner members 180,182, an outer compensating member 184, and two end assemblies 186 and 188. The two end assemblies 186, 188 include extension ends 119 and 121 respectively, which have a concave shape to accept the end probes 116. The two inner members 180, 182 are constructed of the same material having a particular coefficient of thermal expansion. The outer compensating member 184 is constructed of a material having a different coefficient of thermal expansion, such that any expansion of the inner members 180 and 182 is cancelled out (i.e., compensated for) by the expansion of the outer compensating member 184.

As in the preferred embodiment discussed above and as shown in FIGS. 3A and 3B, the coefficient of thermal expansion for the outer compensating member 184 of this embodiment is chosen to take into consideration any expansion by the end adapter assemblies 186, 188 and end probes 116. To accomplish a compensated expansion of the main measuring bar assembly 114, the two inner members 180, 182 and the outer compensating member 184 are cooperatively structured as follows. As shown in FIG. 4A, the outer compensating member 184 is constructed as a hollow tube, or sleeve, having a proximate end 190 and a distal 192 end and includes two internal securing points 193, one located near the proximate end 190 and one located near the distal end 192. The inner members 180 and 182 are substantially identical, each having a proximate end 194, 196 and a distal end 198, 200, respectively. Each of the inner members 180, 182 also has a step 202, which creates a reduced cross-sectional area and a recessed face 204 that begins at step 202 and carries the length of the inner members. The inner members 180, 182 are overlappingly disposed within the outer compensating member 184 having their recessed faces 204 opposed to each other. Inner member 180 includes a pin opening 206 in its distal end 198, and inner member 182 includes a pin opening 206 in its proximate end 196 to receive and retain securing pins 208 that are correspondingly attached to the securing points 193 within the outer compensating member 184.

As shown in FIG. 4B, the inner members 180, 182 are formed in square cross-sectional shape. However, it should be further appreciated that the shapes of the inner members 180, 182 and the outer compensating member 184 may be cylindrical, square, or have any other axial cross-sectional shape, which will allow the members to fit in sliding juxtaposition to each other. It should be still further appreciated that, as illustrated, the members fit close enough to allow them to provide longitudinal support for each other, yet loose enough for them to move slidingly against each other to allow for their individual linear expansion.

The structure of the main measuring bar 114 provides for compensated thermal expansion. To analyze the thermal expansion in steps, we will refer to FIG. 4A and consider that the lower end assembly 186 of the main bar assembly 114 is set at a fixed point of reference. The thermal expansion mathematics are the same as for the preferred embodiment of FIGS. 3A and 3B above, and will be only generally referenced. In response to a given increase in temperature, the distal end 198 of inner member 180 will expand linearly upward a given distance "$\Delta L$" as mathematically expressed in formula (1) above. Again, the term "upward" used herein is a relative term in regard to the illustrations and a positive coefficient of thermal expansion. However, it should be appreciated that the use of materials having negative coefficients of thermal expansion may also be employed such that a movement of the distance "$\Delta L$" would be downward in the illustrations. Due to their interconnection at the upper securing point 193, the distal end 198 of inner member 180 moves both the outer compensating member 184 and the other inner member 182 upward the same amount. Thus, the upper end assembly 188 was also moved "$\Delta L$" upward and away from its original position.

Concurrently, since the inner member 182 is constructed of the same material as inner member 180 and its proximate end 196 engages the proximate end 190 of the outer compensating member 184, inner member 182 also expands in an upward direction by the same amount, "$\Delta L$". Accordingly, without any further action, and considering only the expansion of the two inner members 180 and 182, the end assembly 188 will be at ($\Delta L+\Delta L$), or $2\Delta L$ from its original position. However, the outer compensating member 184 also expands and since it interconnects the two inner members 180 and 182 as described above, its expansion moves the inner member 182 downward in the opposite direction to the expansion of the two inner members 180 and 182.

As in the discussion for the preferred embodiment in FIGS. 3A and 3B, the expansion of the end probes is also included in the expansion formulas so that the change in length of the outer compensating member 184 will be equivalent to the change in length of the two inner members 180 and 182 and the end probes 116. Thus, the expansion of the outer compensating member 184 thereby substantially eliminates any thermal expansion of the other components of the artifact. Additionally, the inner members 180 and 182 need not necessarily be of the same length so that the above mathematical expressions for variations of component length and material selection apply.

Figure 5:
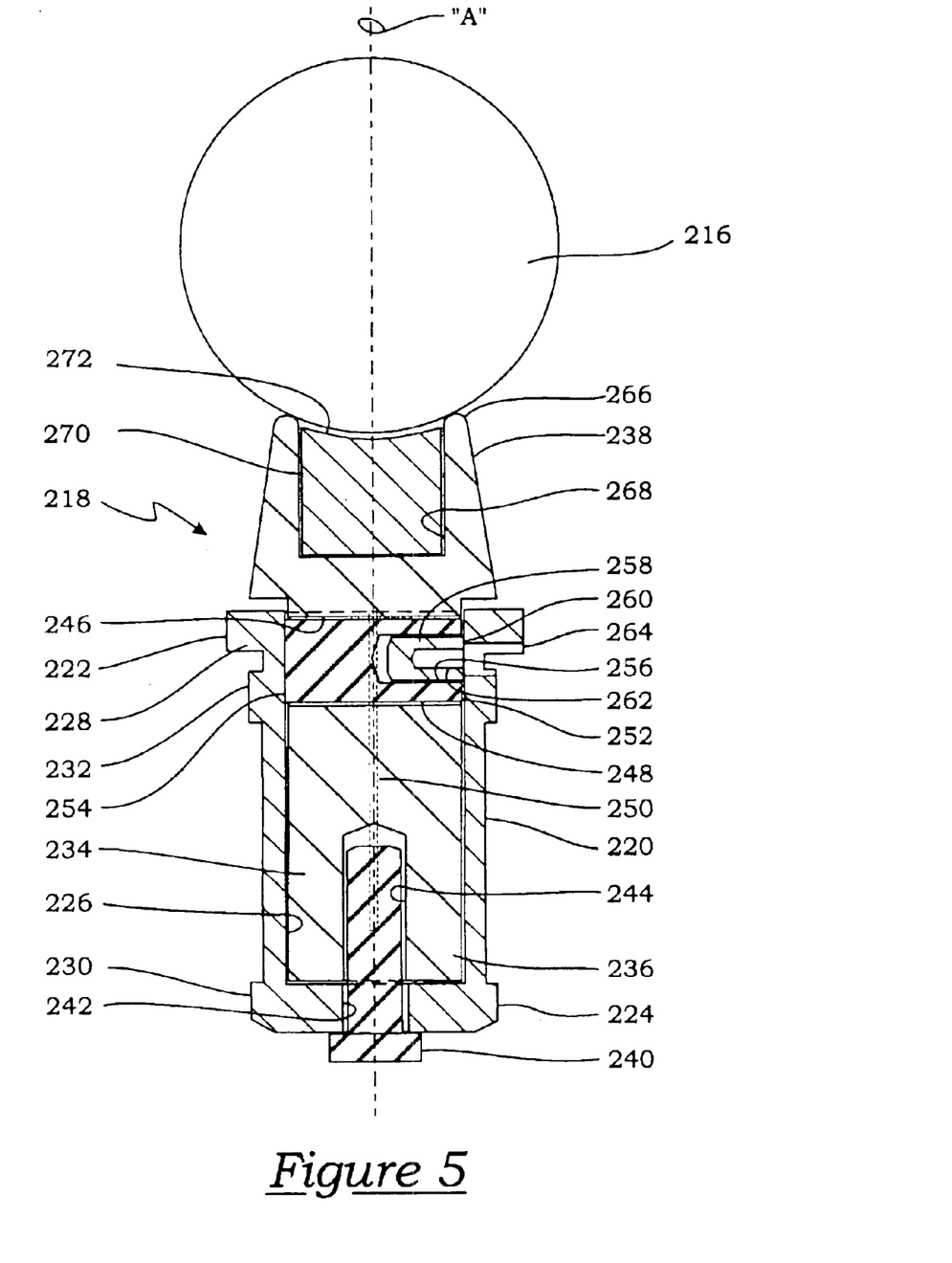
FIG. 5 is a cross-sectional view of an additional embodiment of an end adapter assembly of the present invention.

In another non-limiting embodiment of the spatial reference system of the present invention, the artifact includes a pair of end adapter assemblies as generally indicated at 218 in FIG. 5. In this embodiment, at least one artifact assembly having a measuring bar with a first end and a second end is used in conjunction with a first end adapter assembly and a second end adapter assembly that are operatively mounted to the first and the second ends of the measuring bar. Each of the first, second, and end adapter assemblies 218 are identical. Thus, only one is shown as illustrated in FIG. 5. The measuring bar may be of the type described above and illustrated in FIGS. 3A, 3 B, and 3C, or FIG. 4A. Alternatively, the measuring bar may be a non-compensated type made of one any of a variety of materials having a very low coefficient of thermal expansion. In any of these approaches, a first end probe 216 is mounted to the first end adapter assembly 218, and a second end probe 216 is mounted to the second end adapter assembly 218. The first and second end adapter assemblies 218 each have a predetermined thermal expansion which is cooperative to provide a predetermined change in length that is equal and opposite to the linear expansion of the measuring bar and the first and second end probes 216, thereby substantially eliminating any thermal expansion of the artifact.

The end adapter assembly 218 includes an outer member 220, which has a generally cylindrical shape with an open distal end 222 and a closed proximate end 224 thereby forming an open central cavity 226. The end adapter 218 is slidingly inserted into one of the open ends of the measuring bar up to the retaining ridge 228. Raised support ridges 230 and 232 support the end adapter assembly 218 in the measuring bar and prevent the end adapter assembly from skewing or twisting. The end adapter assembly 218 also includes an inner member 234 with a proximate end 236 and a distal end 238. The cavity 226 of the outer member 220 is adapted to receive the proximate end 236 of the inner member 234 so that the proximate end 236 of the inner member 234 fits within the outer member 220 and is fixedly mounted to the proximate end 224 of the outer member 220 within the cavity 226. More precisely, the inner member 234 is slidingly disposed within the cavity 226 and a threaded fastener 240 passes through a bore 242 in the proximate end 230 of the outer member 220 to engage a threaded bore 244 in the proximate end 236 of the inner member 234. Thus, the fastener 240 secures the proximate end 236 of the inner member 234 to the proximate end 224 of the outer member 220, yet allows the inner member 234 to expand upward, as illustrated, in response to thermal increases. It should be appreciated that any of a variety of other known methods for affixing the inner member to the outer member may be used as long as it does not interfere with or influence the expansion of the components.

The inner member 234 further includes a through bore 246 that is formed laterally across the distal end 238. The through bore 246 is adapted to accept and receive a cylindrical member 248 that is selectively operable to expand and press outward against the sides of the outer member 220 thereby causing the end adapter assembly 218 to be frictionally retained in the end of the measuring bar. In the preferred embodiment, the outer member 220 has a pair of bisectional slots 250 formed through the open distal end 222 and extending a predetermined length of the outer member 220. The cylindrical member 248 is held in the inner member 236 and has a first end 252 and a second end 254. The first end 252 has a threaded bore 256 in which a set screw 258 is threadingly disposed. The set screw 258 includes an outward end 260 that has a tool opening 262, which is formed in the appropriate manner to receive an Allen wrench or similar tool (not shown).

The outer member 220 further includes an access opening 264 in its distal end 222 that provides operative access to the tool opening 262 of set screw 258 as retained in the inner member 234. The access opening 264 has a smaller diameter than the set screw 258 itself. In this manner, an outward turning of the set screw 258 causes the first end 252 of the set screw 258 and the second end 254 of the cylindrical member 248 to press outward against the sides of the outer member 220. This selective expansion of the set screw 258 and the cylindrical member 248 causes the outer member 220 to spread apart at its bisected distal end 222 thereby causing the supporting ridge 228 to press into the inner diameter of the measuring bar and frictionally retain the end adapter 218 in the measuring bar.

The distal end 238 of the inner member 234 extends beyond the distal end 222 of the outer member 220 and is further defined by having a radiused annular surface 266 to support, retain, and center one of the end probes 216. The annular surface 266 is formed such that it properly locates the center of the end probe 216 along the centerline "A" of the end adapter assembly 218 and the measuring bar. In the preferred embodiment, the end probes 216 are spherical and formed of a ferrometallic material that may be magnetically influenced. The annular surface 266 is further defined by having a recessed cavity 268 that is adapted to accept and retain a magnet 270. The magnet 270 also has a generally concaved surface 272 and is disposed in the recessed cavity 268 in such a manner that the concave surface of the magnet 270 is disposed in spaced relationship with respect to the adjacent arcuate surface of the spherical end probe 218. Thus, the magnet 270 is just below but does not touch the end probe 216. In this way, the magnet 270 attracts and retains the end probe 216, but does not influence the thermal expansion of the end adapter assembly 218.

In operation, with the distal end 222 of the outer member 220 fixed to the end of the measuring bar, the proximate end 224 of the outer member 220 will slidingly (i.e. longitudinally) expand inside the measuring bar in response to changes in temperature. Likewise, with the proximate end 236 of the inner member 234 fixed to the proximate end 230 of the outer member 220, the inner member 234 will longitudinally expand within the cavity 226 of the outer member 220. As described above, considering the equations for the expansion of the various components in the artifact, the effective lengths and coefficients of thermal expansion of the outer members 220 and the inner members 234 of the two end adapter assemblies are particularly chosen. More specifically, the material and length of the inner 234 and outer 220 members are chosen so that the expansion of the outer members 220 generally compensate for, and substantially eliminate, the expansion of the inner members 234, the expansion of the end probes 216, and the expansion of the measuring bar.

Thus, the present invention overcomes the disadvantages of the related art by providing a precision measuring bar artifact that compensates for thermal expansion so that it does not change its physical dimensions. Further, the present invention overcomes the disadvantages of the related art by providing a measuring bar artifact that is thermal expansion compensated and can be combined with like artifacts to provide a spatial reference system for precision orienting, locating, and positioning in one, two, and three dimensions.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A spatial reference system comprised of:
   at least one artifact assembly having a measuring bar assembly including an inner member with a proximate end and a distal end, an outer member with a proximate end and distal end, and a compensating member with a proximate end and a distal end operatively disposed between said inner and said outer members, such that said distal end of said outer member is fixedly mounted to said distal end of said compensating member, said proximate end of said compensating member is fixedly mounted to said proximate end of said inner member;
   said artifact assembly further includes a first end adapter and a first end probe and a second end adapter and a second end probe, said first end adapter operatively mounted to said proximate end of said outer member to accept said first end probe, and said second end adapter operatively mounted to said distal end of said inner member to accept said second end probe, said first end probe and said second end probe thereby adapted to provide the end points of said measuring bar a measurement standard, the distance from the point at which said proximate end of said outer member is fixedly mounted to said first end adapter to the point at which said distal end of said outer member is fixedly mounted to said distal end of said compensating member is the same as the distance from the point at which said proximate end of said compensating member is fixedly mounted to said proximate end of said inner member to the point at which said distal end of said inner member is fixedly mounted to said second end adapter, such that said inner member and said outer member have he same effective length; and
   said inner and said outer members each having a predetermined length and a predetermined coefficient of thermal expansion and said compensating member having a predetermined length and a predetermined coefficient of thermal expansion, such that the thermal expansion of said inner and said outer members is substantially eliminated by the expansion of said compensating member.

2. A spatial reference system as set forth in claim 1 wherein the said compensating member is further defined as having a predetermine length and a predetermined coefficient of thermal expansion, such that the expansion of said first and said second end adapters and said first end probe and said second end probe in addition to the expansion of said inner and said outer members is cancelled out and compensated for by the expansion of said compensating member.

3. A spatial reference system as set forth in claim 1 wherein said first end probe and said second end probe are spherical.

4. A spatial reference system comprising:
   at least one artifact assembly having a measuring bar with a first end and a second end, a first end adapter assembly and a second end adapter assembly operatively mounted to said first and said second ends of said measuring bar, a first end probe mounted to said first end adapter assembly, and a second end probe mounted to said second end adapter assembly;
   said first end adapter assembly and said second end adapter assembly each having an outer member formed in a generally cylindrical shape with an open distal end and a closed proximate end thereby forming a central cavity, said outer member adapted to fit within an open end of the measuring bar such that said distal end of said outer member is fixedly mounted to one of said ends of said measuring bar, said first end adapter assembly and said second end adapter assembly each further having an inner member with a proximate end and a distal end, said cavity of said outer member adapted to receive said proximate end of said inner member so that said proximate end of said inner member fits within said outer member and is fixedly mounted to said proximate end of said outer member within said cavity with said distal end of said inner member extending beyond said distal end of said outer member to support and retain one of said end probes; and
   said first end adapter assembly and said second end adapter assembly each having a predetermined thermal expansion which is cooperative to provide a predetermined change in length that is equal and opposite to the linear expansion of said measuring bar and said firs and said second end probes thereby substantially eliminating any thermal expansion of said artifact.

5. A spatial reference system as set forth in claim 4 wherein said proximate end of said inner member is fixedly mounted to said proximate end of said outer member within said cavity by a threaded fastener.

6. A spatial reference system as set forth in claim 5 wherein three of said measuring bar assemblies and three of said end probes are operatively combined to form a two dimensional triangular reference standard.

7. A spatial reference system as set forth in claim 5 wherein five of said measuring bar assemblies and four of said end probes are operatively combined to form a two-dimensional parallelogram reference standard.

8. A spatial reference system as set forth in claim 5 wherein six of said measuring bar assemblies and four of said end probes are operatively combined to form a three-dimensional tetrahedron reference standard.

9. A spatial reference system as set forth in claim 4 wherein said distal end of said inner member is further defined by having an annul surface which is adapted to retain and center one of said end probes.

10. A spatial reference system as set forth in claim 9 wherein said first and said second end probes are spherical and formed of a ferro-metallic material that may be magnetically influenced.

11. A spatial reference system as set forth in claim 10 wherein said distal end of said inner member is further defined by having recessed cavity adapted to accept and retain a magnet disposed below said annular surface such that said magnet attracts and retains said end probe.

12. A spatial reference system as set forth in claim 4 wherein said inner member further includes a through bore formed laterally across said distal end, said through bore adapted to accept and receive a cylindrical member, said cylindrical member selectively operable to expand and press outward against the sides of said outer member thereby causing said end adapter assembly to be frictionally retained in the end of said measuring bar.

13. A spatial reference system as set forth in claim 12 wherein said outer member is further defined as having a pair of bisectional slots formed through said open distal end and extending a predetermined length of said outer member such that said selective expansion of said cylindrical member causes said outer member to spread apart at its said distal end to frictionally retain said end adapter assembly in said measuring bar member.

14. A spatial reference system as set forth in claim 13 wherein said outer member further includes an opening in its said distal end to provide operative access to a set screw threadingly disposed in one end of said cylindrical member as retained in said inner member, said opening being of a smaller diameter than said set screw such that an outward turning of said set screw causes said set screw and said cylindrical member to press outward against the sides of said outer member thereby causing said end adapter assembly to frictionally retain aid end adapter assembly in said measuring bar member.

* * * * *